Aug. 16, 1960 P. DRESSLER 2,948,946
METHOD AND APPARATUS FOR SALT GLAZING CERAMIC WARES
Filed March 7, 1956 7 Sheets-Sheet 1

INVENTOR.
PHILIP DRESSLER

BY Hulbell and Cohen

ATTORNEYS

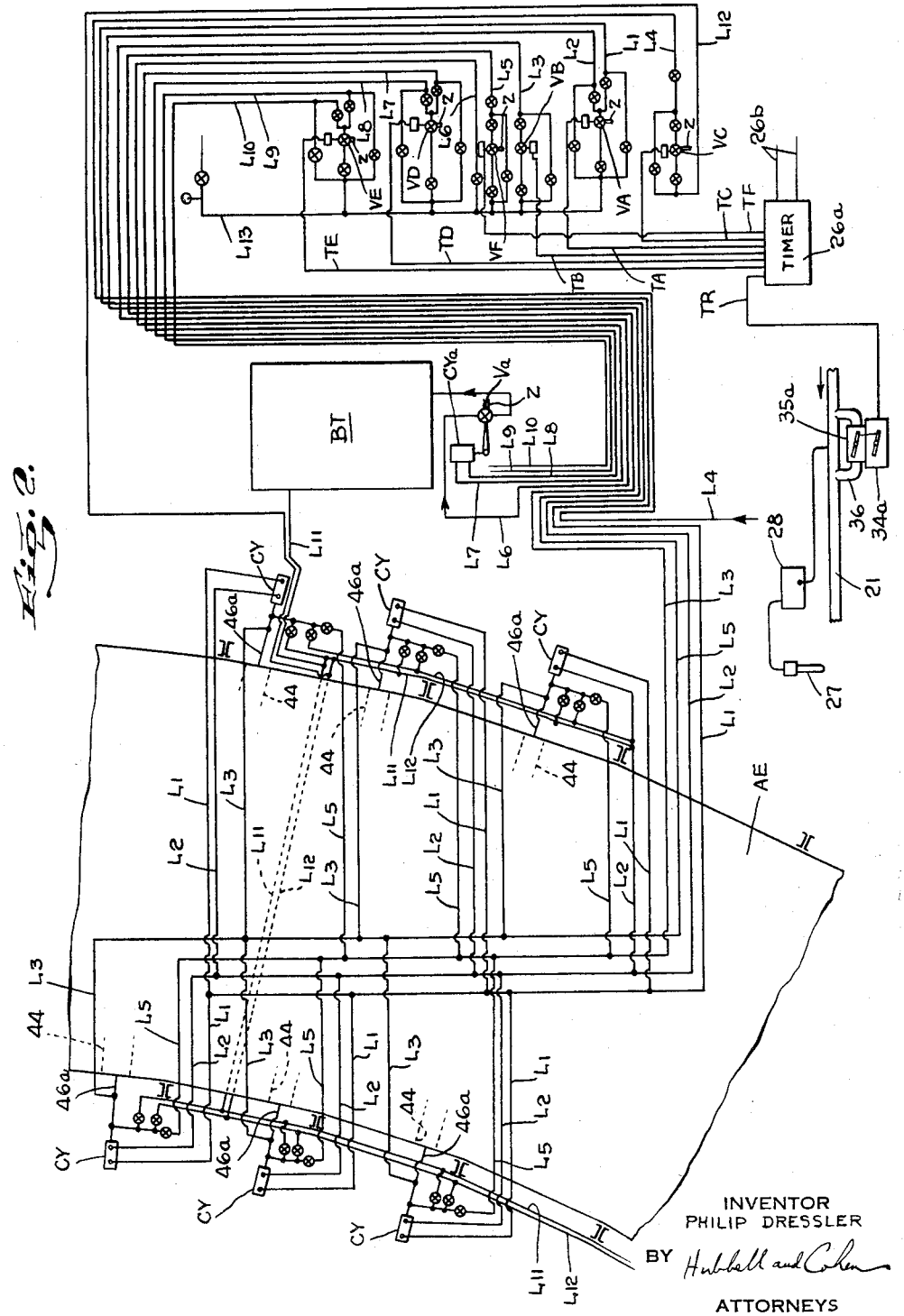

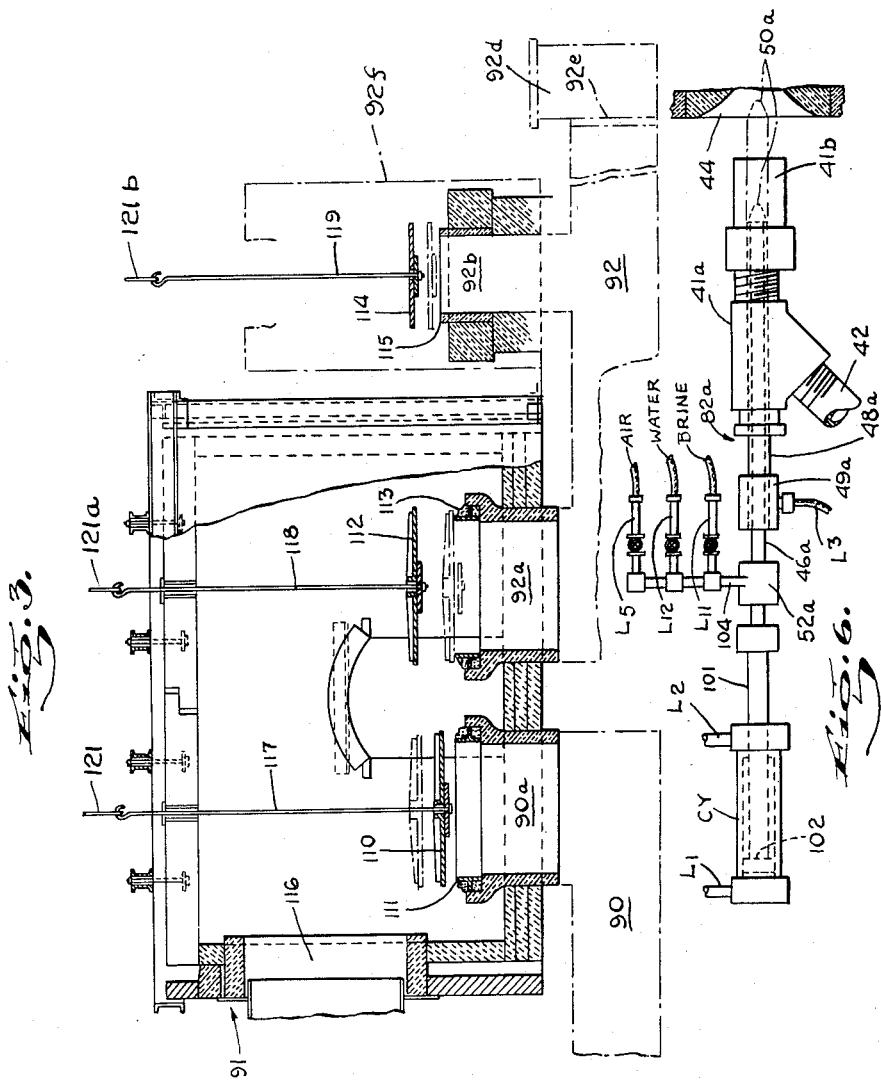

Aug. 16, 1960 P. DRESSLER 2,948,946
METHOD AND APPARATUS FOR SALT GLAZING CERAMIC WARES
Filed March 7, 1956 7 Sheets-Sheet 4
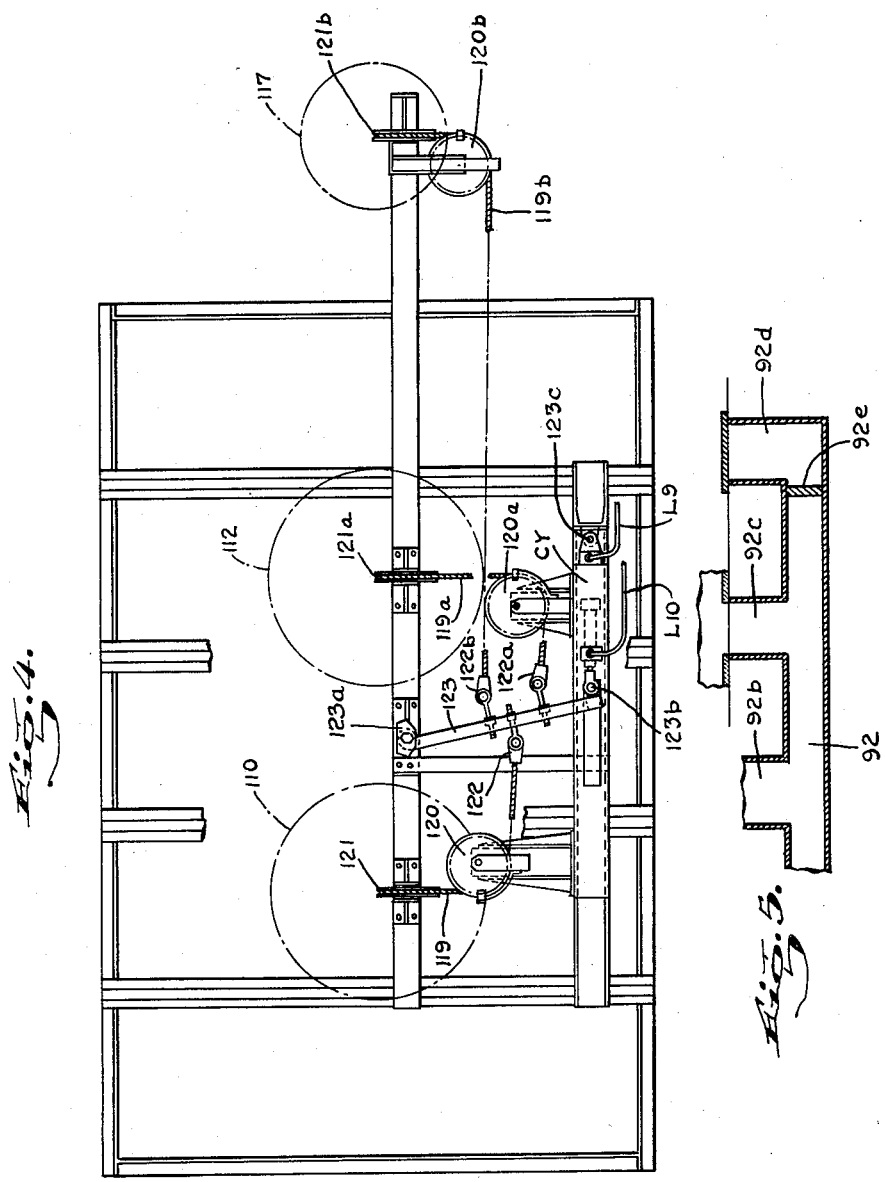
INVENTOR.
PHILIP DRESSLER
BY Hubbell and Cohen
ATTORNEYS Aug. 16, 1960 P. DRESSLER 2,948,946
METHOD AND APPARATUS FOR SALT GLAZING CERAMIC WARES
Filed March 7, 1956 7 Sheets-Sheet 5
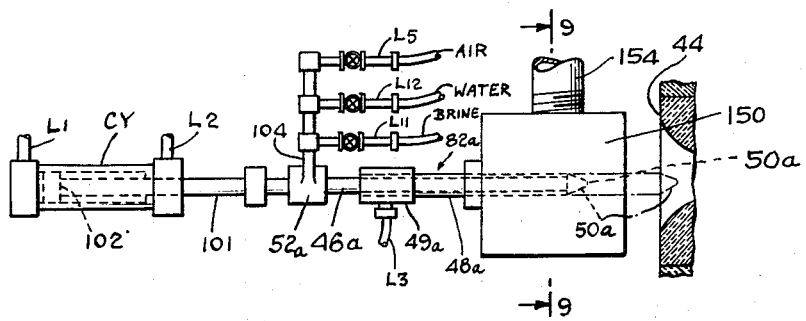
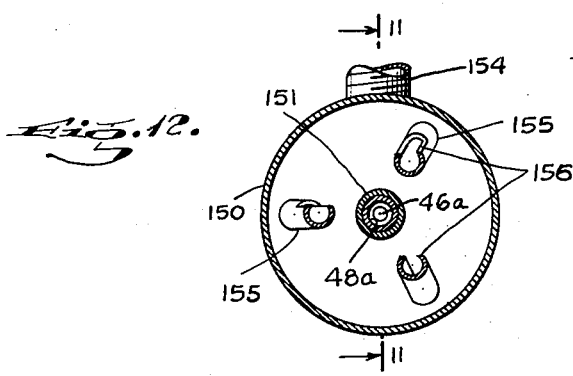
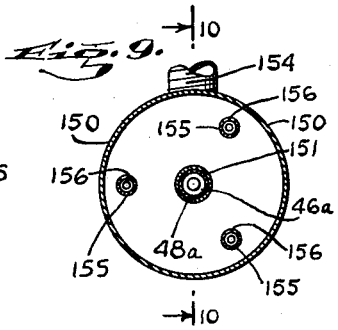
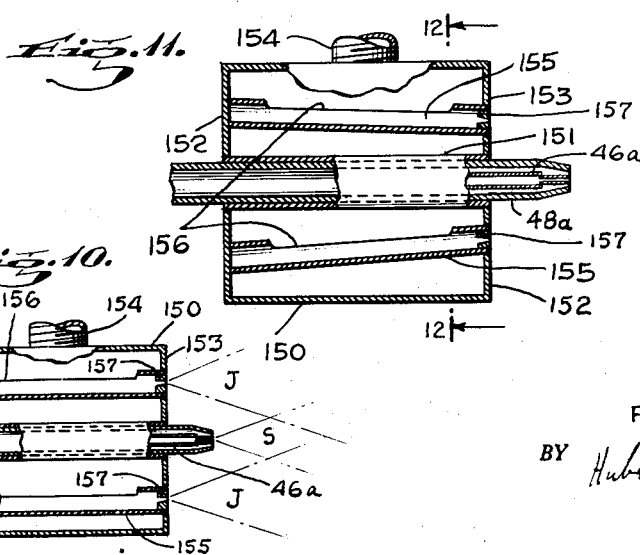
INVENTOR.
PHILIP DRESSLER
BY Hubbell and Cohen
ATTORNEYS

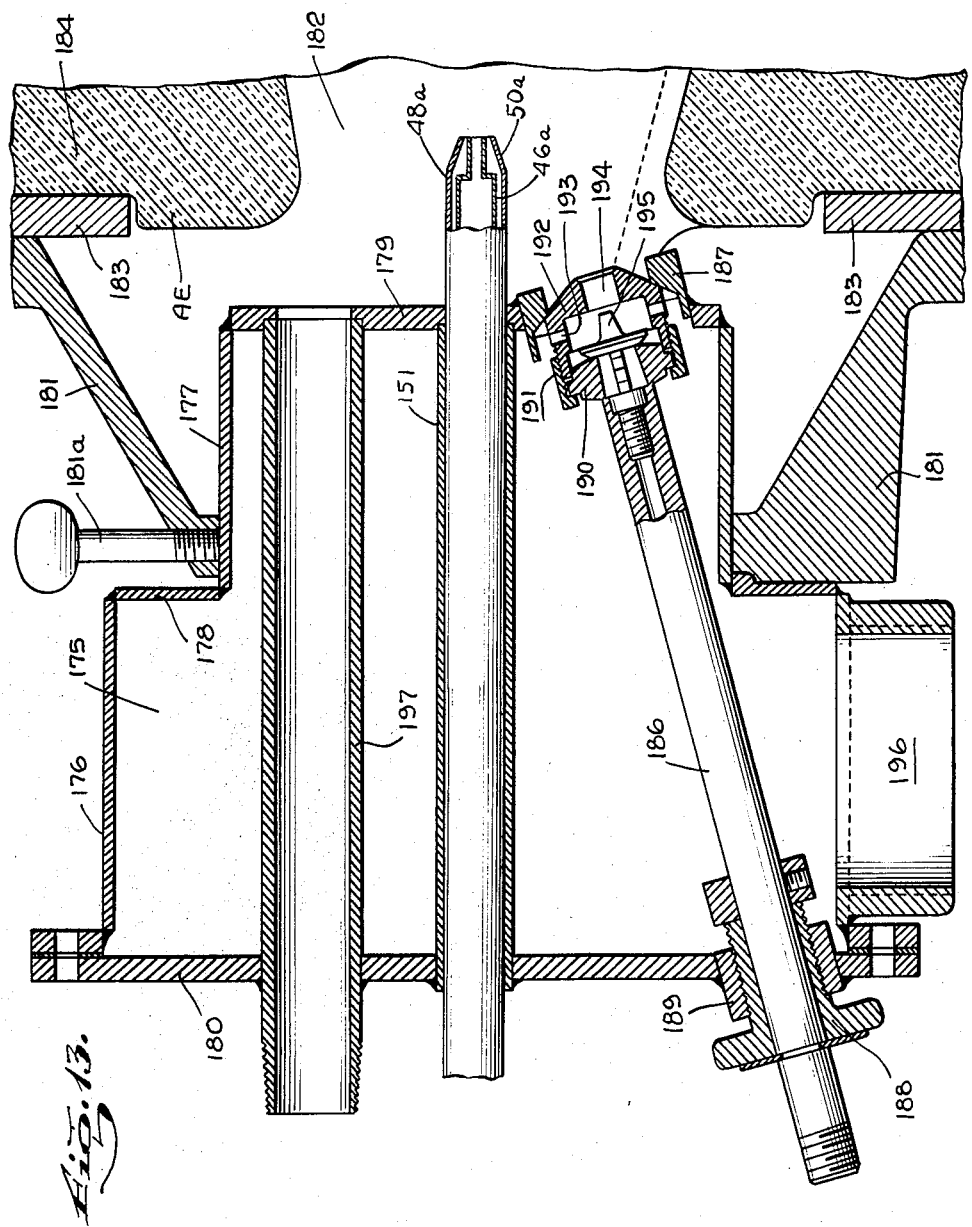

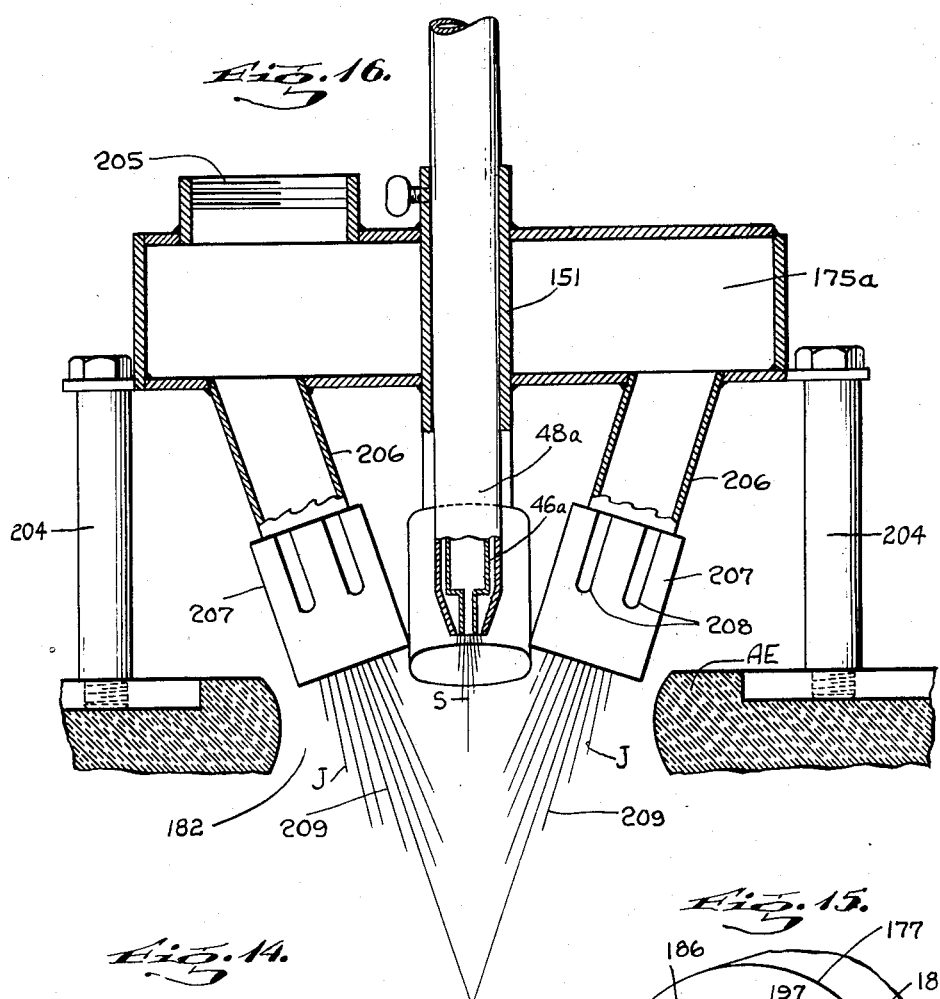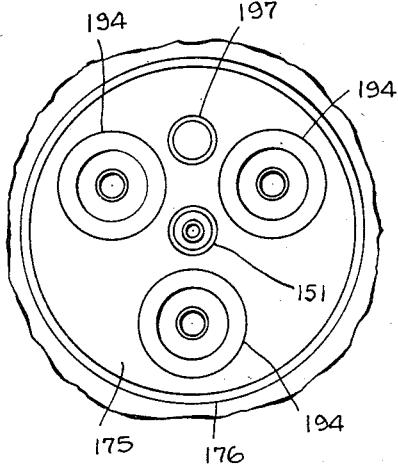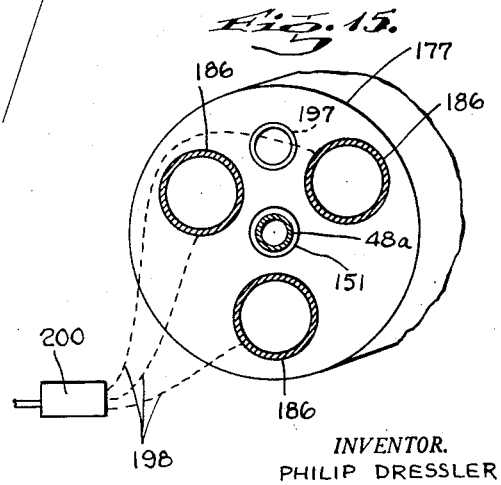

United States Patent Office 2,948,946
Patented Aug. 16, 1960

2,948,946

METHOD AND APPARATUS FOR SALT GLAZING CERAMIC WARES

Philip Dressler, Pittsburgh, Pa., assignor to Swindell-Dressler Corp., Philadelphia, Pa., a corporation of Pennsylvania Filed Mar. 7, 1956, Ser. No. 570,117

8 Claims. (Cl. 25—142)

The general object of my present invention is to provide improved apparatus for salt glazing ceramic wares. The desirability of salt glazing sewer pipes and other ceramic wares has long been recognized, and various methods of and apparatus for the purpose have been proposed and some of them have been used.

The present application is a continuation in part of my prior application, Serial No. 496,840, filed March 25, 1955, now abandoned.

All of the prior salt glazing apparatus heretofore in successful use, of which I have knowledge, has been apparatus operative to effect the evaporation of solid salt and the formation of vapors which are brought into contact with the wares to be glazed while those wares are being fired and are at or near their maximum firing temperature.

A primary object of the present invention is to provide effective apparatus for producing salt glazing vapors by the evaporation of glazing salt which is in the form of a solution, and thereby avoid practical difficulties inherent in the use of salt glazing vapors formed by the evaporation of solid salt.

Heretofore, in firing salt glazing wares in an intermittent kiln which is heated by the combustion of solid fuel, it has been common practice to periodically put salt on top of the kiln heating fuel beds. In salt glazing wares being fired in an intermittent kiln heated by the combustion of oil or gas, it has been the usual practice to periodically pass solid salt into the kiln fire boxes, ordinarily through an opening in the kiln at a level above the burner.

In salt glazing wares in tunnel kilns heated by the combustion of oil or gas, unsuccessful attempts have been made to inject solid salt in more or less finely divided form into the path of the fluid fuel fed into the firing zone of the kiln. In practice it has been found that the introduction of solid salt into a tunnel kiln firing chamber by injection of the salt into a burner space is open to the practical objection that the evaporation of the salt is ordinarily incomplete, so that some solid salt particles deposit on and corrode the exposed kiln and kiln car surfaces, and other solid salt particles are deposited on the wares and thereby give the latter a rough surface, instead of the smooth surface which the salt glazing operation is intended to produce.

To avoid the objectionable effects of salt particles depositing on the hot kiln surfaces and on the wares in the kiln, it has been proposed to evaporate solid salt in auxiliary furnaces or fire boxes which are intended to periodically pass salt vapors into the kiln chamber. While some practical use has been made of such auxiliary furnaces or boxes, they are open to serious objection because of the practical necessity of continuously maintaining salt evaporating conditions in said furnaces or boxes, and a resultant rapid deterioration of those furnaces. In an attempt to better this situation, the Robson Patent 2,514,143, of July 14, 1950, has proposed the use of auxiliary furnaces or salt evaporating boxes which are removable to facilitate their repair or replacement when their refractory linings have been destroyed by the corrosive action of the salt.

By providing apparatus for evaporating salt in solution, as described herein, advantages other than those mentioned are obtainable. For one thing, the use of the apparatus employed herein permits the passage of salt into the kiln to be completely terminated at the end of each salting operation, so that in the following operating period the kiln operates as it would if it had no salting provisions. The use of the present invention thus makes it practical to regulate the kiln draft and atmosphere as contemplated in the Ladd Patent 2,307,322 of January 5, 1943. The evaporation of the salt in solution form also permits the use of apparatus which closely and accurately regulates the amount of salt injected into the furnace in each salting operation, and an easy and accurate regulation of the duration and frequency of the successive salting operations.

A further practically important object of the invention is to provide apparatus for preventing the accumulation in the salt solution supply apparatus of salt in solid form during periods in which the salting operation is interrupted. Such accumulations of salt in solid form will occur when any portion of the solution supply piping exposed to water evaporating temperatures contains salt solution during periods in which the salting action is interrupted. In such case the salt solution subjected to temperatures above the boiling point becomes supersaturated and more or less of its salt content is crystallized, and may wholly or partially clog the solution passages.

Another practically important object of the invention is to provide effective apparatus for dispersing the solution in atomized form in a stream of burning gases and hot products of combustion which maintains the wares at the glazing temperature. Conventional atomizing apparatus, and an atomizing agent which may be compressed air, steam, fuel oil or gas, may be used to atomize the solution.

Another practically important object of the invention is to provide tubular atomizing apparatus including a brine atomizing nozzle which discharges into a kiln through a kiln wall opening, and is mounted for axial movement away from and toward said inlet, so that the nozzle may be moved away from said inlet to avoid overheating when no brine is being discharged through the nozzle. In practice, said tubular element may advantageously be mounted for axial movement in a stationary casing through which a main or "volume" stream of combustion air is passed into said inlet.

A further specific object of the invention is to provide simple and effective apparatus for controlling the relative amount of fluid fuel, combustion air, and purging fluid supplied to a kiln.

For some uses of the present invention, purging means are provided for removing salt solution from portions of the supply apparatus in which water might otherwise be evaporated out of the solution during periods in which the supply of brine to the kiln is interrupted. The desired purging effect may be obtained by passing compressed air or water through the portion of the apparatus in which salt deposits might otherwise occur.

The term "salt glazing" is used herein to include glazing means using glazing agents having different compositions. For example, the glazing agent may consist wholly of a solution of sodium chloride in water in some cases, and in other cases, the glazing solution may include one or more other glazing agents, such as borax and zinc chloride. The glazing solution is commonly referred to as "brine." In one desirable form of the invention, the control apparatus is arranged to automatically increase the amount of fuel burned during the periods in which salt solution is being supplied into the kiln, to compensate more or less accurately for the kiln cooling effect of the solution.

Some features of my invention may be used with advantage in periodic kilns, of the general type and character disclosed and claimed in the joint application, Serial No. 280,438, filed April 3, 1955, by the applicant herein and Charles D. Tinker. However, the present invention is of especial utility when used in continuous tunnel kilns, though the glazing action is more difficult to carry out in a continuous tunnel kiln than in periodic kilns.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 2 is a diagrammatic illustration of a fuel and burner control system included in the kiln shown in Fig. 1;

Fig. 3 illustrates a damper system for exhausting products of combustion and salt fumes from the kiln shown in Fig. 1;

Fig. 4 illustrates damper actuating means included in the damper system shown in Fig. 3;

Fig. 5 is a small scale showing of an unillustrated portion of the damper system shown in part in Fig. 3;

Fig. 6 illustrates a burner adapted for use in the kiln shown in Fig. 2, and including an axially adjustable timing element;

Fig. 8 illustrates a modification of the burner structure shown in Fig. 7;

Fig. 9 is a section on the line 9—9 of Fig. 8;

Fig. 10 is a section on the broken line 10—10 of Fig. 9;

Fig. 11 is a sectional view similar to Fig. 10 illustrating another form of the present invention;

Fig. 12 is a sectional view taken along the line 12—12 of Fig. 11;

Fig. 13 is a vertical sectional view of another type of burner structure embodying the present invention;

Fig. 14 is an end elevational view of the portion of the burner shown in Fig. 10 which is farthest from the kiln;

Fig. 15 is a diagrammatic view representing the manner in which fuel is introduced to the fuel carrying tubes in the structure illustrated in Fig. 13; and Fig. 16 is a sectional view of another form of burner embodying the present invention.

Figure 1:
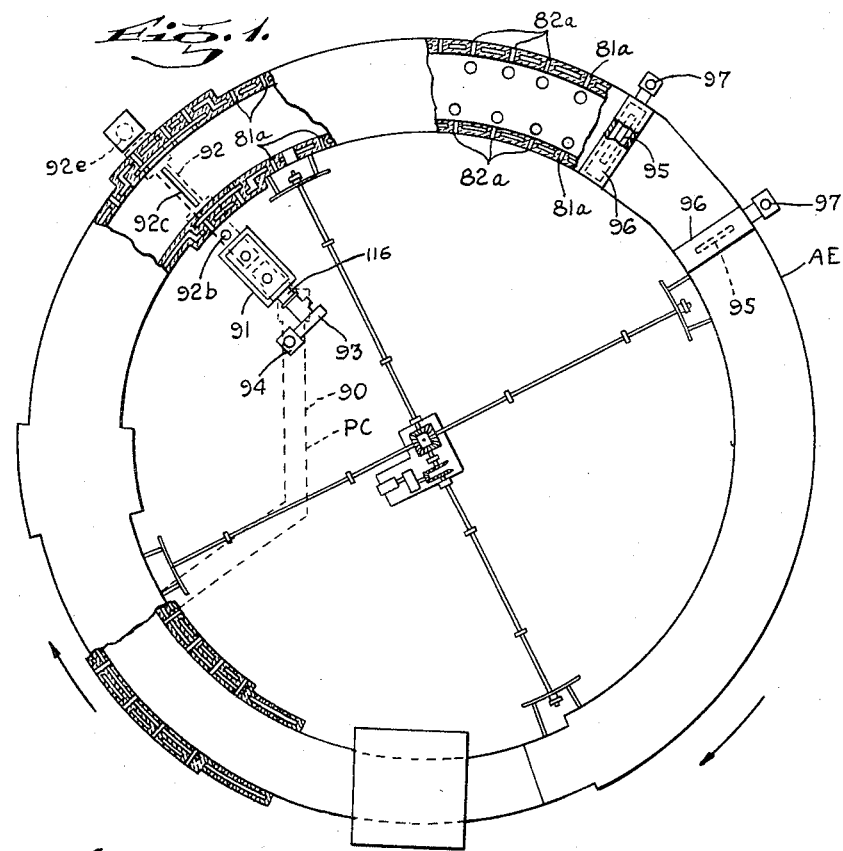
Fig. 1 is a plan section of a continuous tunnel kiln of circular form.

In the accompanying drawings, I have illustrated the use of my invention in a continuous circular tunnel kiln AE similar in general type to the kiln AD shown in Fig. 8 of the previously mentioned application, Serial No. 280,438. However, the kiln AE differs from said kiln AD in a number of practically important structural respects, hereinafter mentioned. As shown in Fig. 1, there are nine standard burner units 81a and three salting burner units 82a at each side of the kiln AE, distributed along the firing zone intermediate the preheating and cooling zones. One of the nine pairs of standard burners is interposed between the firing and cooling zones while the other eight pairs of standard burners are arranged side-by-side in a row extending clockwise away from the adjacent end of the preheating zone. Each of the burner units 81a and 82a is in register with a corresponding burner wall port 44. The burner units 81a need not differ significantly in structure or operation from the units 81 shown in Fig. 8 of application Serial No. 280,438, and in the previously mentioned Ladd patent. However, burner units 82a differ significantly from the burner units 82 shown in said application Serial No. 280,438, as a result of their automatic adjustment and control provisions hereinafter described.

As shown diagrammatically in Fig. 1, products of combustion are withdrawn from the inlet end portion of the preheating zone of the kiln through an underground exhaust duct 90 beneath the ground surrounded by the circular kiln structure AE. As is hereinafter more fully explained, the duct 90 opens into a damper house 91. Salt fumes are periodically withdrawn from the portion of the kiln intermediate the preheating and firing zones through an underground duct 92 which also discharges into the damper house 91. The latter has an outlet opening into the inlet of a fan 93 which discharges into a stack or chimney 94. To prevent objectionable flow of glazing fumes into the cooling zone, one or more kiln outlet slots 95 are formed in the roof of the kiln structure. As shown, there are two roof slots 95 each opening into a horizontal conduit or outlet box 96 at the top of the kiln structure. Each conduit 96 opens at the outer side of the kiln into a corresponding stack or chimney 97 at the outside end of the conduit. One of the slots 95 is adjacent the one standard pair of burners 81a interposed between the cooling zone and the salting burners 82a. The second slot 95, conduit 96 and stack 97 are somewhat closer to the exit end of the kiln.

Fig. 6 diagrammatically illustrates one of the burner units 82a. As shown, that unit includes a stationary casing 41a and burner head 41b with a conduit connection 42 connected to a source of a combustible mixture of fuel gas and "volume" or combustion air which is passed into the kiln through a corresponding kiln wall burner port 44. The apparatus shown in Fig. 6 also includes an atomizing element comprising concentric pipes 46a and 48a and a pipe fitting 49a. The ends of the pipes 46a and 48a adjacent the associated furnace port 44, constitute an atomizing nozzle end 50a. The nozzle elements 46a, 48a, 49a and 50a are all axially connected to one another for simultaneous axial adjustment relative to the stationary casing 41a. During each salting period, the nozzle 50a projects from the casing element 41b into, or into close proximity to the port 44. Except during the salting periods, the atomizing nozzle end 50a is normally in the position within the casing 41b shown in dotted lines in Fig. 6.

As shown in Fig. 6, atomizing air is passed into the annular space between the pipes 46a and 48a through a pipe L3 and the fitting 49a, in which the outer end of the tube 48a is anchored. The outer end of the tube 46a opens into and is anchored in a movable pipe fitting 52a. The latter is mechanically connected to the stem 101 of a piston 102 movable in a stationary cylinder CY. Control pipe lines L1 and L2 connected to a source of compressed air L13, are employed to actuate the piston 101 and thereby move the nozzle 50a respectively toward and away from the associated burner element 44, at the beginning and end of each glazing operation. A pipe 104 connected to and extending transversely away from the pipe fitting 52a, is in communication through said fitting with the bore of the pipe 46a. The pipe 104 is connected through branch pipe fittings to control pipe lines L11, L12 and L5, respectively. Each of said pipe lines is connected to the pipe 104 through an individual check valve x which operates to prevent back flow through the line.

The above mentioned pipe lines L1, L2, L3, L5, L11 and L12 form elements of an automatic control system diagrammatically illustrated in Fig. 2. The pipe line L11 is shown as connected in Fig. 2 to a source of brine under pressure during each salting operation. The source of brine is diagrammatically shown as a tank BT. The pipe lines L11 and L5 are separately connected to sources BT and L13, respectively, of purge water and purge air for washing brine out of the different burner pipes 46a at the end of each salting operation. Each of the pipe lines L3, L5, L11 and L12 shown in Fig. 6, includes a portion, at least, formed of flexible conduit material, which may be plastic hose, to avoid interference with the axial adjustments of the corresponding pipe 46a and nozzle 50a. Fig. 2 diagrammatically illustrates a section of the kiln AE including the six salting burners 82a shown in Fig. 1. In Fig. 2 only the axially movable element 46a of each burner 82a is shown. Each valve element 46a shown in Fig. 2 is moved toward and away from the corresponding burner inlet 44 by an individual cylinder CY actuated by pressure transmitted to the inner and outer ends of the cylinder by pipes L1 and L2, respectively.

The cylinders CY are actuated to move their respective valve elements 46a toward and away from the associated kiln inlet ports 44a by mechanism comprising a timer 26a. As diagrammatically shown in Fig. 2, the timer 26a also actuates elements TC, TA, TB, TF, TD and TE, respectively connected to and adjusting solenoid valves VC, VA, VB, VF, VD and VE. The timer 26a also actuates an element TR to adjust a flow regulator 34a. The regulator 34a may increase the "volume" air supplied to the air conduit 42 or fuel supply line flow in response to variations in the air supply.

Figs. 3 to 5 illustrate the structure of the damper house 91 and the connections thereto. The damper house in the form shown, is a rectangular structure above the ground level with vertical inlets 90a and 92a opening into the lower portion of the damper house through its bottom wall. As shown, the inlet 92a is the vertical end portion of the duct 92 through which all of the salt fumes are withdrawn from the kiln, except the relatively small fume portions withdrawn from the kiln through the two roof slots 95 and their connections to the two stacks 97. The fumes withdrawn from the kiln through the duct 92 are at a relatively high temperature, and provisions are made for passing cooling air into admixture with the fumes passing to the outlet 92a through the duct 92. As shown, the cooling air passes into the duct 92 through a vertical bleeder inlet 92b which is closed most of the time, but is opened to permit atmospheric air to be drawn into the duct 92 during the relatively short though frequent periods in which salt fumes are drawn into the damper house through the duct 92 and its outlet 92a. As shown, the upper end of the bleeder inlet 92b is located in the lower portion of a well 92f which has its upper end open to the atmosphere.

An extension of the duct 92 at the outer side of the kiln AE opens into the lower end of a vertical inspection chamber 92d which normally has its upper end closed by a removable cover. An upright inlet connection 92c to the duct 92 opens into the kiln chamber. Communication between the duct 92 and the chamber 92d is normally closed by a bulk-head or wall 92e. That wall is advantageously constructed so that it may be readily broken away to permit inspection and repairs. Following such inspection, and repairs, if any, the bulk-head wall 92e may be rebuilt.

In the normal contemplated use of the apparatus shown in Fig. 3, a throttling damper 110 regulates the pressure in and outflow through the outlet opening 90a, and dampers 112 and 114 open and close the outlet 92a, and the bleeder inlet 92b. As shown, the upper end portions of the outlets 90a and 92a and the inlet 92b are formed with damper seats 111, 113 and 115. The outlet 92a and the inlet 92b are normally closed by the dampers 112 and 114, respectively, except during the relatively short periods in which salt fumes are being withdrawn from the kiln AE through the inlet connection 92c. During the salting periods in which the dampers 112 and 114 are open, the damper 110 occupies its throttling position shown in dotted lines in Fig. 3 in which the damper 110 is at the reduced elevation required for the maintenance of the proper pressure in the duct 90, notwithstanding the reduction in the rate of outflow of products of combustion then passing through the duct 90.

In normal operation, the damper 110 is suspended by a suspension element 117, and the dampers 112 and 114 rest upon the damper seats 113 and 115, respectively, except during the relatively brief intervals in which those dampers are supported above their respective seats by suspension elements 118 and 119. As shown, each of the suspension elements 117, 118 and 119 includes a rod directly connected to the corresponding damper, and cable elements 121, 121a and 121b which are connected to the upper ends of the suspension rods 117, 118 and 119, respectively, as is shown in Fig. 4. Each of the cable elements 121, 121a and 121b runs over a corresponding pulley mounted to rotate about a horizontal axis and supported by a stationary supporting structure. The elements 121, 121a and 121b extend horizontally away from the previously mentioned pulleys each into contact with and around a portion of a corresponding one of pulleys 120a, 120b and 120c. The cable elements thus passing over the last mentioned pulleys extend away from the latter and into engagement with anchor elements 122, 122a and 122b which are respectively attached to a lever 123. The latter has one end pivotally connected to a fixed support 123a and has its second end connected through a link 123b to the stem of a piston air cylinder CY. The latter has its end remote from the lever 123 connected by a pivot 123c to the stationary structure on which the previously mentioned pulleys and lever 123 are supported.

Air pipes L9 and L10 connect the end portions of the air cylinder to outlets for air under pressure from the valve VE shown in Fig. 2 and adjusted by the timer 26a. When the timer 26a adjusts the valve VE to transmit air under pressure through the pipe L9 to the right hand end of the cylinder CY shown in Fig. 4, the lever 123 is turned in the clockwise direction about its connection to the supporting structure. This lowers the damper 110 into its full line position shown in Fig. 3, and simultaneously moves the dampers 112 and 114 upward from their respective seats 113 and 115, into their positions shown in full lines in Fig. 3. When the valve VE is adjusted by the timer 26a to release the air pressure in the line L9, and pressure is transmitted through the pipe line L10 away from the valve VE, the piston in the air cylinder CY is moved to the right, as seen in Fig. 4. This adjusts the lever 123 in the counter-clockwise direction and thereby raises the damper 110 into its position shown in full lines in Fig. 3, and lowers the dampers 112 and 114 into engagement with their respective seats 113 and 115.

The control elements TR and 34a are shown in Fig. 2 as arranged for use in regulating the air flow in an air supply pipe 21 and thereby regulating the temperature in the kiln AE. As shown in Fig. 2, the regulating element 34a controls the adjustment of a valve 35 in a pipe 36 forming a by-pass to the air supply pipe 21, and the rate at which heat is supplied through the pipe 21 is directly controlled by a thermocouple 27. The latter actuates a temperature controller 28 to adjust a control valve mechanism 29 including a throttling valve 30 in the pipe 21.

I have discovered that apparatus of the general character diagrammatically illustrated in Figs. 1 to 7, is practicably operative to produce desirable salt glazing effects not heretofore obtainable, provided suitable provisions are made to prevent salt accumulations in the piping, and in particular, to prevent such accumulations in piping through which brine is passed at intervals to the combustion apparatus.

Under effective operating conditions reasonably assumed to include a 13 minute salt glazing operation cycle with a 2 minute salting period in the latter portion of each cycle, the operation of the automatic control system shown diagrammatically in Figs. 1 and 2 may well include no normal salting operation during the first 9 minutes and 20 seconds period of 13 minute cycle. At the end of that period, a brining operation is initiated as follows:

The four-way solenoid valve VA is energized through contact TA of the timer 26a to pass compressed air through the pipe line L1 to the outer end of each of the cylinders CY shown in Fig. 2; and the two-way solenoid valve VB is energized through the timer contact TB to pass compressed air through the corresponding pipe line L3 to the atomizing air tube of each of the burners including the elements 46a of Fig. 2; and the timer 26a acts through the contact TR to increase the flow of fuel through the burners including the members 46a, and temporarily eliminate the sort of regulating action obtained in Fig. 2 by means of the temperature controller 28 and flow regulator 34.

At 9 minutes and 30 seconds after the initiation of the cycle, the four-way solenoid valve VD is energized through the timer contact TD to pass compressed air through the pipe line L7 to the cylinder CYa shown in Fig. 2, and cause the pipe line L6 to move brine from the brine tank BT through the associated pipe lines L11 to the corresponding burners.

At 9 minutes and 40 seconds after the initiation of the cycle, the four-way solenoid valve VE is energized through the timer contact TE to pass compressed air through the pipe line L9 to the cylinder CYb shown in Fig. 4 and thereby open the salt fume damper 112 and bleeder damper 114, and to partially close the products of combustion damper 110.

At 11 minutes and 30 seconds after the initiation of the cycle, the salting operation is interrupted, the air supply in line L7 is vented and air is admitted from line L8 to cylinder CYa, the brine tank BT is vented through the vent Z in the valve VA, and the three-way solenoid valve VC is energized through the timer contact TC to pass purge water through the pipe lines L4 and L12 to the burner brine inlets.

At 12 minutes after the initiation of the cycle, the four-way solenoid valve VE is deenergized by the timer contact TE which cuts off the supply of compressed air through the pipe line L9, and opens the air supply connection through the pipe line L10, and actuates the cylinder CYa to close the salt fume damper 112 and bleed damper 114, and to increase the extent of opening of the damper 110.

At 12 minutes and 30 seconds after the initiation of the cycle, the three-way solenoid valve VC is deenergized through the operation of the timer contact TC which stops the water purge flow through the pipe line L12 to the burner brine tubes and relieves the pressure in the pipe line L12 through the drain vent Z in the three-way solenoid valve VC. At the same time, the three-way solenoid valve VF is energized through the timer contact TF to admit compressed air through the line L5 and to initiate an air purge through the burner brine tubes.

At 13 minutes after the initiation of the cycle, the three-way solenoid valve VF is deenergized through the action of the timer contact TF, interrupting the compressed air supply to the burner brine tubes through the pipe line L5 and venting pipe line L5 to atmosphere through the vent Z in the three-way solenoid valve VF. At the same time, the timer contact TR cuts in pyrometric controller means for normal operation and the four-way solenoid valve VA is deenergized through the timer contact TA to cut off the supply of compressed air through the pipe line L1 to the outer ends of the cylinders CY, and to permit the supply of air to the inner ends of the cylinders CY through the pipe line L2.

It is to be noted that in the foregoing description, the reference to a two-way solenoid valve means that the valve operates only as an on and off valve; the reference to a three-way solenoid valve is a reference to a valve which operates in one position to permit flow through the valve, and in another position to cut off flow through the valve and open a vent either to atmosphere or to a drain to relieve the pressure on the down stream side of the valve; and the reference to a four-way solenoid valve is a reference to a valve which in one position directs the flow of fluid to one end of a cylinder, CY, CYa or CYb, and simultaneously opens a vent to relieve the pressure in the other end of the cylinder, and in the other position reverses the operation. It is also to be noted that each of the valves VA, VD and VE shown in Fig. 2, is provided with a drain or vent Z.

A full sized circular commercial tunnel kiln having an overall diameter of said kiln of more than 100 feet and of the general type shown in Fig. 1, and having the general operating characteristics disclosed in Figs. 1 to 6 of this application, is now in successful commercial use in one of the plants of a prominent operator of ceramic kiln. Although the present invention is illustrated in combination with the tunnel kiln shown in Fig. 1 and has been successfully employed with such a kiln, the present invention has operated successfully with other types of tunnel kilns and is accordingly not limited to the tunnel kiln construction shown in Fig. 1.

Figure 7:
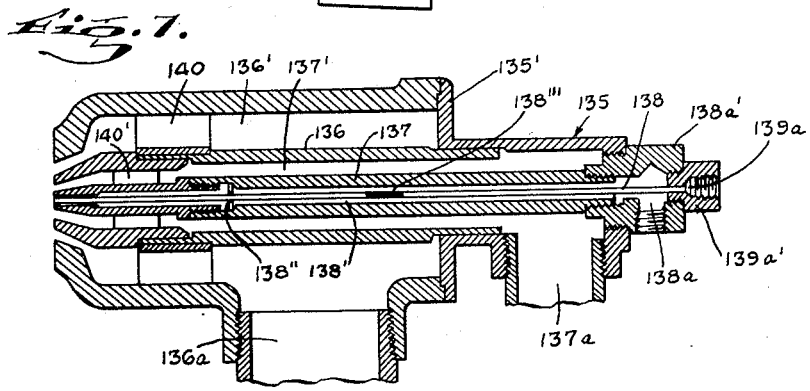
Fig. 7 illustrates a burner structure adapted to continuously atomize fuel oil and periodically atomize a brine solution.

In Fig. 7 I have illustrated by way of example, a simple and effective burner including means for intermittently discharging brine and purging liquid into a kiln, for use in replacement of such a burner as is shown in Fig. 6, when the heating fuel is not gas but oil. The burner shown in Fig. 7 comprises a tubular casing or body 135 surrounding coaxial tubular walls 136, 137 and 138 proportioned to provide annular fluid spaces of progressively decreasing diameters respectively surrounded by the casing body and tubular walls. The casing body and the tubular walls 136—138 are shown as all terminating in the same transverse plane at the discharge end of the burner. The annular space 137' between the casing and the tube 136 extends from the discharge end of the burner to a radial casing wall portion 135' which is intermediate the discharge end of the burner and the inlets to the tubular spaces 137' and 138' surrounding the walls 137 and 138.

The so-called "volume" air, or main combustion air portion, passes into the annular space surrounding the tube 136 through a lateral inlet 136a. Atomizing air is continuously passed through the annular space 137 to the discharge end of the burner from an atomizing lateral air inlet 137a. During each salting period, fuel oil is continuously passed to the discharge end of the burner through the annular space between the pipes 137 and 138 from a lateral oil inlet 138a adjacent the outer end of the burner. Brine is passed into the bore 138' of the innermost tube 138 from the inlet 139a to that tube. As shown, the inlets 136a, 137a, 138a and 139a are at progressively greater distances from the discharge end of the burner. The lateral inlet 138a and the inlet 139a are formed in fitting elements 138a' and 139a'. The element 138a' is threaded into the end of the casing body section 135'. The element 138a' has its inner end portion internally threaded for engagement with the inlet end of the tube 137, and externally threaded for engagement with the coaxial fitting 138a'. The outer end of the tubular member 138 is brazed or otherwise secured to the fitting 139a'.

As shown, a spider 138" is interposed between inner and outer walls of the tubes 137 and 138. The vanes 140 may be inclined to the axis of the burner and are thus adapted to serve the double purpose of properly spacing the tube 136 axially away from the casing 135 and of giving a whirling action to the air passing away from the space 136a through the tapered restricted discharge end portion of that space. Similarly, vanes 141 are interposed between the discharge end portions of the tubular elements 136 and 137 to serve the double purpose of insuring the proper relative spacing between the last mentioned tubes and of giving a whirling action to the atomizing air passing away from the discharge end of the burner through the tapered restricted space between the last mentioned tubes.

The rate at which the "volume" or main combustion air stream passes into the space 136' is advantageously varied in accordance with variations in the kiln temperature in the same general manner in which the air stream through the pipe 21 of Fig. 4 is regulated. The amount of oil passed into the space between the tubes 137 and 138 may advantageously be increased during the salting period as by means of the control apparatus employed to automatically initiate and terminate the individual salting periods.

It is to be noted that the burners shown in Figs. 6 and 7 have some different operating characteristics. Thus in the gas burner of Fig. 6, the flame is held back close to the burner nozzle starting not more than one-half inch away from the nozzle. This is because the burner 41b is an internally piloted burner and the mixture of air and gas is intimate and leads to a rapid propagation of combustion. The brine atomizer 50a is pushed in front of the burner, a distance of approximately 1½ inches, and the brine is sprayed from this point. It probably does not form the actual volume of spray for some 4 or 5 inches further into the flame. By that time sufficient heat is generated by the combustion and a high enough temperature reached in the gases so that the cooling effect of the brine spray does not reduce the temperature below the ignition point, with the result that the flame is maintained on the burner nozzle and a rapid evaporation of the brine takes place in a high temperature portion of the flame.

Unlike the Fig. 6 gas burner, the oil burner 135 of Fig. 7 shows the atomizer head for the oil and the brine at the face of the burner. The oil flame naturally does not hold back as close to the burner as does the gas flame. In fact, it does not start to burn for a distance of 4 or more inches in front of the burner. The rate of flame propagation is much slower in the oil flame because in effect, the oil has to be evaporated into a gas before it can mix with the air and burn rapidly. The result is that the high temperature in the flame may not be reached for a distance of approximately 8 or 9 inches from the face of the burner.

When the brine is sprayed in at the face of the burner, the cooling effect of the brine evaporation tends to take place in a portion of the flame which has not yet reached a high enough temperature to sustain combustion in the face of this cooling effect, and the flame may be put out by the brine unless a very great increase in oil supply is made. This is harmful to the kiln operation because it raises the temperature of the kiln too much during the brine operation. The problem then is how to get that brine spray into the body of the flame at a greater distance from the burner. This cannot be done by just extending the brine tube because if this is done, then the atomization of the brine is prevented and at the same time that of the oil is also interfered with.

One solution for the problem, shown in Figs. 8, 9 and 10, is to replace the single oil burner for evaporation, by a plurality of side-by-side burners of the ordinary oil burner type, so as to form a concentrated ball of fire in front of the burners, and then to introduce a brine atomizing tube of the same type and design as that used in the gas burner shown in Fig. 6, into a central portion of the group of three oil burners. The brine atomizer then can be inserted to an adjustable point well in advance of the burners during the period of brining, and withdrawn during the period of non-brining, in exactly the same fashion as in the gas burner.

The burner shown in Figs. 8, 9 and 10, includes all of the elements shown in Fig. 6 except the elements 41a, 41b and 42. In lieu of those elements, use is made of a stationary chamber 150 through which extend the axially movable pipe 48a and nozzle 50a, or portions thereof.

The chamber 150 is shown as cylindrical and coaxial with a stationary tubular element 151 which is substantially smaller in diameter than the chamber 150. The chamber 150 is defined by circular end walls 152 and a cylindrical peripheral wall 153. The central portions of the end walls are attached to the adjacent ends of the tube 151. The cylindrical outer wall 153 of the chamber 150 is formed with an inlet opening 154 through which gaseous material is introduced into the chamber. Tubular elements 155 extending between the end walls 152 are radially displaced from the central tubular element 151, and are formed with inlet openings 156 through which the gaseous material may pass from the interior of the chamber 150 through the open forward ends of the elements 155, and thence away from the chamber 150 and into an adjacent furnace inlet, which may be like the inlet 44 shown in Fig. 6. The nozzles 157 at the outlet end of tubes 155 are arranged to produce fuel jets J which have convergent portions that intersect the brine stream S from nozzle 50a for reasons which will become clear hereinafter.

In the normal use of the burner shown in Figs. 8–10, the nozzle 50a may be retracted as shown in Fig. 6, during the relatively long periods in which brine is not being atomized. During periods in which such brine is being atomized, the tubular tip 50a may be advanced more or less, as is the outlet nozzle 50a shown in Fig. 6. By suitable adjustments of the burner ports 41b and 50a, the brine atomizer can be adjusted into a position in which its discharge end is suitable positioned between the forward end of the chamber 150 and an adjacent furnace port which may be similar to the port 44 shown in Fig. 6.

With the nozzle 50a extended outwardly in position as best shown in Fig. 8, air and brine may be supplied to tubes 46a and 48a, respectively, so as to atomize brine at the outlet end of the nozzle. Simultaneously, air-gas mixture is supplied to chamber 150 through inlet 154 and the air-gas mixture passes into the tubular elements 155 through elongated openings 156 in the walls thereof. The gas-air mixture is supplied to the chamber under pressure and, accordingly, the air-gas mixture is forced out of the tubes 155 at the outlet end thereof adjacent wall 153 where combustion commences taking place. The fuel jets J are to have portions which converge and intersect each other so that the stream of atomized brine passes through the area of highest temperature resulting from the combustion of the air-gas mixture ejected from the tubular elements 155. The temperature in this region is sufficiently high to evaporate the salt in the brine solution so as to properly disperse the evaporated salt into the kiln for the salt glazing operation. At the completion of the salt glazing operation, the flow of brine is discontinued and water is introduced into the pipe 46a so as to purge the pipe of any brine and thereby eliminate possible corrosive effects thereof. After the water purge is completed, air is supplied to pipe 46a to purge the pipe and the nozzle 50a of any residual water therein.

Referring now to Figs. 11 and 12, another form of burner structure embodying the present invention is illustrated therein. In the form shown in Figs. 11 and 12, the structure is substantially identical to the structure shown in Figs. 8 to 10, the major difference being that the tubes 155 are angularly related to one another rather than being parallel as shown in Figs. 8 to 10. Particularly, the tubes 155 are converged toward one another as they extend from the rear wall 152 to the front wall 153 of the chamber 150. With the tubes 155 so disposed, it will be apparent that a much larger proportion of the fuel being ejected through the nozzles 157 will converge and intersect one another and the stream of atomized brine solution. With this large proportion of fuel intersecting, the temperature in the area of intersection of the fuel jets will be extremely high to thereby effectively vaporize the salt in the brine solution without causing such a reduction of the temperature in the kiln to cause the flame to die out. Accordingly, a more efficient structure is achieved by converging the fuel carrying tubes 155.

Fig. 13 discloses a tubular chambered structure 175 alongside a portion of the side wall of the kiln AE, and constitutes the preferred form of the present invention. The structure 175 comprises a cylindrical outer casing element 176, and a coaxial casing element 177 at the inner end of, and smaller in diameter than the element 176. The adjacent ends of the sections 176 and 177 are connected by a vertical plate 178. Except for port openings hereinafter described, the inner end of the tubular element 177 is closed by an end wall or plate 179 and the outer end of the chamber 175 is closed by an end wall or plate 180. The structure 175 is connected to and supported by a metallic bracket element 181 which surrounds a kiln inlet port 182, and is connected to a metallic outer portion 183 of the kiln wall 184 surrounding the port 182. The bracket 181 is shown as clamped to the upper side of the element 177 by a clamping element 181a.

A central tube 151 has its ends connected to and supported by the end walls 179 and 180, and surrounds a brine atomizer including tubes 48a and 46a. The brine atomizer extends out of the tube 151 toward, and as shown, into the port 182. The nozzle 50a may be axially adjustable in the tube 151. In practice, however, the tube 48a may normally be held in a fixed position such as that shown in Fig. 13. Brine to be atomized is passed into the furnace inlet 182 through the nozzle 50a.

Oil to be atomized is passed into the outlet end of the chamber 177 by three tubes 186. As collectively shown in Figs. 13, 14 and 15, each of the three tubes 186 extends through and is secured in the outer edge portion of the plate 180, while the end of each tube 186 adjacent the kiln is surrounded by a supporting structure 187 which is connected to the wall 179. To simplify the illustration, only one of the tubes 186 is shown in Fig. 13. In the preferred construction illustrated, each of the three tubes 186 is inclined toward the central tube 151, and has its axis in a plane passing through the axis of the last mentioned tube, and has its end adjacent the end wall 179 nearer to the central tube 185 than is the end of the tube 186 adjacent the end wall 180. The outer end portion of each tube 186 extends through a tubular supporting element 188 which has its outer surface threaded through a tubular supporting element 189 which is anchored in and extends through the plate 180.

The end of each tube 186 adjacent the wall 179 is connected to that wall by a supporting structure which includes an annular element 190 surrounding and attached to the adjacent end of the corresponding tube 186. Each element 190 is connected to, and is supported by an annular element 191. As shown, the element 191 is also connected to an annular element 192. The element 192 extends into and is normally supported by the plate 179 and is spaced away from the element 190 to provide channels 193 for the flow of air out of the chamber space 175, and through a central outlet port 194. The latter normally discharges a stream of oil admixed with air into the kiln inlet 182. An axial nozzle 195 in the discharge end of each tube 186, discharges a jet of oil through the central portion of the port 194.

The fluid passing through each outlet port 194 into the kiln inlet 182, includes oil supplied by the adjacent tube 186, and also includes atomizing and combustion air supplied under pressure to the chamber 175 through the inlet 196. Air thus supplied to the space 175 passes through the ports 193 to the respectively associated outlet ports 194. Atomizing and combustion air may also pass directly from the chamber 175 into the kiln inlet 182 through the annular spaces between the members 187 and 192, when the tubular elements 188 are rotated to draw the members 186 inward away from the respectively adjacent stationary annular member 187, thus providing a simple means for controlling the temperature of the flame. An inspection tube 197 adjacent and parallel to the central tube 185, extends through the space 175 and permits inspection of the operating conditions in the inlet port 182. As shown in Fig. 12, flexible conduits 198 pass oil to be atomized into the outer ends of the tubes 186 from a supply valve 200.

Structure of the general character shown in Figs. 13, 14 and 15 may take other forms, one of which is shown by way of example in Fig. 16. The structure shown in Fig. 16 comprises a chamber 175a having a cylindrical wall portion extending between transverse front and rear walls. The latter are connected by a tube 151. Advantageously and as shown, the tube 151 is in line with the central portion of the inlet 182, as is the tube 185 shown in Fig. 10. Tube 48a extends longitudinally through the tube 151 and may either be rigidly secured to, or angularly adjustable in the tube 151. The gas-air fuel mixture under pressure normally passed into the chamber 175a through inlet ports 205, is passed out of the chamber through outlet ports 206 and their enlarged extensions 207. As indicated, there is one port 205 at the inlet side of the chamber 175a, and four outlet ports 206 at the outlet side of the chamber 175a. As shown, the four outlet ports 206 are symmetrically disposed about the tube 151 although asymmetrical arrangements may be employed. The tubes 206 and 207 are inclined toward the tube 151 in the same general manner as the tubes 186 collectively shown in Figs. 13 and 15 are inclined away from the rear wall 180 of the chamber 175. As will be apparent, the number of ports may be either less or greater than four but are preferably three or more. As diagrammatically shown, nozzle 50a and tubes 206 discharge fluid jets S and J, respectively, into the adjacent kiln AE through the adjacent side wall kiln opening 182. As shown, the member 175a is attached to the outer end of supports 204 shown as extending perpendicularly away from the portion of the kiln side wall AE surrounding the adjacent port 182.

As those skilled in the art will recognize, the fluid streams J and S passed into the kiln heat up as they approach the kiln inlet. Said streams may attain combustion temperature before they pass into the kiln.

While it will be clear to those skilled in the art that the structures illustrated in Figs. 8 to 16 in which provision is made for a unitary structure which introduces a plurality of spaced fuel jets into the kiln, it is within the scope of the present invention to employ a plurality of individual fuel injectors. In such a structure the plurality of injectors would preferably be arranged symmetrically about a brine atomizer so as to provide for a high temperature area through which the atomized brine should pass. Furthermore, it will be obvious that the individual fuel injectors could be disposed at angles so as to cause a large percentage of the fuel streams or jets to intersect the brine whereby to increase the temperature of the high temperature area.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The method of firing and glazing ceramic wares in a kiln chamber, which consists in maintaining said wares at a glazing temperature by passing fluid fuel and combustion air into said chamber through at least one burner having fuel and air supply means, passing a solution containing glazing material into said burner at regular intervals, and purging said solution containing glazing material from said burner at the end of each of said intervals with a liquid solvent, and then purging said solvent with a gas.

2. Apparatus for burning and glazing ceramic wares comprising a heated kiln having an enclosing wall and an opening in said wall, a chambered structure alongside said opening comprising a chamber having an outlet wall adjacent and alongside said opening and having an inlet wall more remote from said opening, means for passing combustible fluid into said chamber through an opening in said inlet wall, means for passing combustible fluid out of said chamber through said outlet wall and into said enclosing wall opening, a central tube extending through said chamber, and a tubular member telescopically supported in said tube and adjustable in the latter toward and away from said enclosing wall opening and means for moving said tubular member toward and away from said enclosing wall opening.

3. Apparatus for burning and glazing ceramic wares comprising a heated kiln having an enclosing wall and an opening in said wall, a cylindrical chamber with one end adjacent and alongside said wall opening and formed with a central passageway, an axially adjustable element extending into, and longitudinally adjustable in said central passageway, means for longitudinally adjusting said element, said axially adjustable element being adapted to be connected to a source of liquid glazing material, a plurality of laterally displaced tubular elements extending between said end walls and having openings intermediate their ends, means for passing a mixture of fluid fuel and air under pressure into said chamber, and means for discharging said mixture through openings in said end wall adjacent said wall opening and in register with the adjacent ends of said tubular elements.

4. Apparatus for burning and glazing ceramic wares comprising a heated kiln having an enclosing wall and an opening in said wall, a cylindrical chamber with a displaced pair of end walls, one of said end walls being adjacent and alongside said wall opening, an open ended central tubular passageway extending between said end walls, an axially adjustable element extending into and longitudinally adjustable in said central passageway, means for longitudinally adjusting said element, said axially adjustable element being adapted to be connected to a source of liquid glazing material, a plurality of tubular elements laterally displaced from said central passageway and extending between said end walls and formed with inlet openings, said end wall adjacent said wall opening being formed with openings through which said tubular elements pass fluid into said wall opening.

5. The method of firing and glazing ceramic wares in a kiln chamber, which consists in maintaining said wares at a glazing temperature by passing fluid fuel and combustion air into said chamber through at least one burner having fuel and air supply means, passing an aqueous salt solution into said burner at regular intervals, purging said aqueous salt solution from said burner at the end of each of said intervals by passing water therethrough, and then purging said purging water from said burner by passing air therethrough.

6. Apparatus for glazing ceramic ware in a kiln chamber, comprising atomizing means adapted to be directed into said kiln chamber, means connected to said atomizing means for periodically supplying a salt solution to said atomizing means for spraying said solution into said kiln chamber, means connected to said atomizing means for periodically supplying unsalted solvent of said solution to said atomizing means for purging said solution therefrom, means for actuating said means for periodically supplying said solvent to said atomizing means effective upon the discontinuation of the supply of said salt solution thereto, means for periodically supplying purging air to said atomizing means, and means for actuating said means for supplying purging air effective upon the discontinuation of the supply of unsalted solvent to said atomizing means.

7. A method of glazing wares in a kiln chamber, comprising the steps of introducing a pair of angularly related intersecting streams of combustible fluid into said chamber, periodically introducing into said chamber through an atomizer an atomized spray of salt solution which passes adjacent the area of intersection of said combustible streams, whereby to evaporate the salt in said solution to glaze said wares, purging said atomizer of said salt solution upon the discontinuance of the introduction thereof into said chamber by passing a liquid solvent through said atomizer, and then purging said atomizer of said liquid solvent by passing a gas therethrough.

8. A method of glazing wares in a kiln chamber, comprising the steps of introducing at least three angularly related streams of combustible fluid into said chamber so that said streams all intersect therewithin, periodically introducing into said chamber through an atomizer an atomized spray of salt solution in such a direction that it intersects said streams in their area of intersection, whereby to evaporate the salt in said solution to glaze said wares, purging said atomizer of said salt solution upon the discontinuance of the introduction thereof into said chamber by passing a liquid solvent through said atomizer, and then purging said atomizer of said liquid solvent by passing a gas therethrough.

References Cited in the file of this patent

UNITED STATES PATENTS

| Number | Name | Date |
|---|---|---|
| 543,741 | Long | July 30, 1895 |
| 739,788 | Marcom et al. | Sept. 22, 1903 |
| 1,160,806 | Weustner et al. | Nov. 16, 1915 |
| 1,269,132 | Tierney | June 11, 1918 |
| 1,344,049 | Lucke | June 22, 1920 |
| 1,556,208 | Dressler | Oct. 6, 1925 |
| 1,622,820 | Bastian | Mar. 29, 1927 |
| 1,758,473 | Schoop | May 13, 1930 |
| 1,798,297 | Youngman et al. | Mar. 31, 1931 |
| 1,919,322 | Dressler | July 25, 1933 |
| 1,922,857 | Meachem | Aug. 15, 1933 |
| 1,964,544 | Trinks | June 26, 1934 |
| 2,173,484 | Lerch et al. | Sept. 19, 1939 |
| 2,305,908 | Stewart | Dec. 22, 1942 |
| 2,307,322 | Ladd | Jan. 5, 1943 |
| 2,320,099 | Ramsay | May 25, 1943 |
| 2,444,899 | Meincke et al. | July 6, 1948 |
| 2,499,926 | Lloyd | Mar. 7, 1950 |
| 2,514,143 | Robson | July 4, 1950 |
| 2,525,407 | Frei | Oct. 10, 1950 |
| 2,855,655 | Dressler et al. | Oct. 14, 1958 |